United States Patent
Li et al.

(10) Patent No.: US 11,172,414 B2
(45) Date of Patent: Nov. 9, 2021

(54) COORDINATED CELL DETERMINING METHOD AND NETWORK DEVICE

(71) Applicant: HUAWEI TECHNOLOGIES CO., LTD., Guangdong (CN)

(72) Inventors: Xiaojie Li, Xi'an (CN); Qi Li, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 24 days.

(21) Appl. No.: 16/585,365

(22) Filed: Sep. 27, 2019

(65) Prior Publication Data

US 2020/0029257 A1 Jan. 23, 2020

Related U.S. Application Data

(63) Continuation of application No. PCT/CN2017/079114, filed on Mar. 31, 2017.

(51) Int. Cl.
*H04W 36/00* (2009.01)
*H04W 16/26* (2009.01)

(52) U.S. Cl.
CPC ....... *H04W 36/0058* (2018.08); *H04W 16/26* (2013.01); *H04W 36/0069* (2018.08); *H04W 36/00837* (2018.08)

(58) Field of Classification Search
CPC combination set(s) only.
See application file for complete search history.

(56) References Cited

U.S. PATENT DOCUMENTS

| | | | | |
|---|---|---|---|---|
| 9,332,516 | B2 * | 5/2016 | Blankenship | H04W 56/0015 |
| 2009/0264142 | A1 | 10/2009 | Sankar et al. | |
| 2009/0296635 | A1 * | 12/2009 | Hui | H04W 52/243 370/328 |
| 2012/0082082 | A1 * | 4/2012 | Etemad | H04L 5/14 370/312 |
| 2012/0190400 | A1 * | 7/2012 | Khayrallah | H04B 7/0452 455/524 |
| 2012/0320775 | A1 * | 12/2012 | Lee | H04L 5/0035 370/252 |

(Continued)

FOREIGN PATENT DOCUMENTS

| | | | |
|---|---|---|---|
| CN | 103096368 A | 5/2013 | |
| CN | 104219724 A | 12/2014 | |

(Continued)

OTHER PUBLICATIONS

NSN, Nokia, "On enhancements for small cell on/off operation," 3GPP TSG-RAN WG1 Meeting #74bis, R1-134527, Guangzhou, China, Oct. 7-11, 2013, 3 pages.

(Continued)

*Primary Examiner* — Hoang-Chuong Q Vu
(74) *Attorney, Agent, or Firm* — Fish & Richardson P.C.

(57) ABSTRACT

Embodiments of this application provide a coordinated cell determining method and a network device. The method includes: determining, by a first network device, a cell in a disabled state in a plurality of cells that are covered by a second network device, where the first network device is adjacent to the second network device; and determining, by the first network device, the cell in the disabled state as a coordinated cell.

13 Claims, 3 Drawing Sheets

(56) References Cited

U.S. PATENT DOCUMENTS

| | | | |
|---|---|---|---|
| 2014/0135049 A1* | 5/2014 | Hirata | H04L 1/0026 455/501 |
| 2014/0219150 A1 | 8/2014 | Lee et al. | |
| 2014/0313915 A1* | 10/2014 | Lee | H04B 7/024 370/252 |
| 2015/0043542 A1* | 2/2015 | Hoehne | H04L 5/0091 370/336 |
| 2015/0189589 A1* | 7/2015 | Legg | H04W 52/0206 370/311 |
| 2015/0215825 A1* | 7/2015 | Kim | H04W 36/30 370/331 |
| 2015/0222399 A1 | 8/2015 | Cheng et al. | |
| 2015/0234977 A1* | 8/2015 | Lee | G06F 30/398 716/52 |
| 2015/0349937 A1* | 12/2015 | Kim | H04L 5/0057 370/252 |
| 2015/0351116 A1 | 12/2015 | Shoshan et al. | |
| 2015/0358881 A1 | 12/2015 | Cui et al. | |
| 2016/0044576 A1* | 2/2016 | Hahn | H04W 48/08 455/434 |
| 2016/0112177 A1 | 4/2016 | Zheng et al. | |
| 2016/0302172 A1* | 10/2016 | Phan | H04L 1/0009 |
| 2016/0337964 A1* | 11/2016 | Mochizuki | H04W 52/0206 |
| 2016/0353339 A1 | 12/2016 | Cui et al. | |
| 2017/0006532 A1* | 1/2017 | Wang | H04W 48/16 |
| 2017/0013671 A1 | 1/2017 | Xu et al. | |
| 2017/0111922 A1* | 4/2017 | Uchino | H04W 72/1257 |
| 2017/0171768 A1* | 6/2017 | Kim | H04W 76/28 |
| 2018/0192366 A1* | 7/2018 | Bontu | H04W 52/143 |
| 2020/0022037 A1* | 1/2020 | Wang | H04L 5/0044 |

FOREIGN PATENT DOCUMENTS

| | | |
|---|---|---|
| CN | 104270784 A | 1/2015 |
| CN | 104640185 A | 5/2015 |
| CN | 104811962 A | 7/2015 |
| CN | 105101417 A | 11/2015 |
| CN | 105142161 A | 12/2015 |
| CN | 106304232 A | 1/2017 |
| EP | 2563065 A1 | 2/2013 |
| EP | 3065438 A1 | 9/2016 |
| JP | 2013533697 A | 8/2013 |
| JP | 2014239439 A | 12/2014 |

OTHER PUBLICATIONS

Office Action issued in Japanese Application No. 2019-553198 dated Nov. 4, 2020, 7 pages (with English translation).

PCT International Search Report and Written Opinion in International Application No. PCT/CN2017/079,114, dated Nov. 1, 2017, 17 pages (With English Translation).

Alcatel-Lucent Shanghai Bell et al., "Small Cell Discovery Performance based on UL Signals," 3GPP TSG RAN WG1 Meeting #75, R1-135166; San Francisco, USA, Nov. 11-15, 2013, 8 pages.

Extended European Search Report issued in European Application No. 17903189.3 dated Feb. 14, 2020, 10 pages.

Office Action issued in Chinese Application No. 201780089282.9 dated Apr. 20, 2020, 14 pages (with English translation).

ZTE, "On the benefits of introducing a Discovery Signal," 3GPPTSG-RAN WG1 Meeting #75, R1-135353; San Francisco, USA, Nov. 11-15, 2013, 3 pages.

Quan Yanyang, "Research on Neighbor Relation Algorithms in LTE System," South China University of Technology, 2015, 2 page (with English abstract).

LG Electronics, "Signalling issues to support inter-eNB CoMP NIB," 3GPP TSG-RAN WG3 Meeting #83, R3-140274, Prague, Czech Republic, Feb. 10-14, 2014, 6 pages.

Office Action issued in Chinese Application No. 201780089282.9 dated Apr. 7, 2021, 7 pages (with English translation).

* cited by examiner

```
┌─────────────────────────────────────────────┐
│ A first network device determines a cell in a│
│ disabled state in a plurality of cells that are covered │─ 301
│ by a second network device, where the first network │
│ device is adjacent to the second network device │
└─────────────────────────────────────────────┘
                      │
                      ▼
┌─────────────────────────────────────────────┐
│ The first network device determines the cell in the │─ 302
│ disabled state as a coordinated cell │
└─────────────────────────────────────────────┘
```

COORDINATED CELL DETERMINING METHOD AND NETWORK DEVICE

CROSS-REFERENCE TO RELATED APPLICATIONS

This application is a continuation of International Patent Application No. PCT/CN2017/079114, filed on Mar. 31, 2017, the disclosure of which is hereby incorporated by reference in its entirety.

TECHNICAL FIELD

This application relates to the field of wireless communications technologies, and in particular, to a coordinated cell determining method and a network device.

BACKGROUND

The International Telecommunication Union imposes extremely high requirements on performance of a next-generation mobile communications system, for example, maximum system transmission bandwidth is required to reach 100 MHz, peak rates of uplink data transmission and downlink data transmission are required to respectively reach 1 Gbps and 500 Mbps, and further imposes a high requirement on system average spectrum efficiency, especially edge spectrum efficiency. To meet requirements of a new system, the 3rd Generation Partnership Project (3rd Generation Partnership Project, 3GPP) proposes using a coordinated multipoint (Coordinated Multiple Points, CoMP) transmission technology in a next-generation mobile cellular communications system, namely a long term evolution-advanced (Long Term Evolution-Advanced, LTE-A) system to improve system performance. The coordinated multipoint transmission technology means cooperation between a plurality of geographically separated transmission points. Generally, the plurality of transmission points are base stations of different cells. The coordinated multipoint transmission technology includes downlink coordinated multipoint transmission and uplink coordinated multipoint transmission.

Technical solutions of the downlink coordinated multipoint transmission are mainly classified into two types: joint scheduling and joint transmission. The joint scheduling refers to allocating mutually orthogonal resources to different terminals through coordination of time resources, frequency resources, and space resources between cells, to avoid mutual interference. Inter-cell interference is a major constraint for performance of a terminal at a cell edge, inter-cell interference can be reduced through the joint scheduling, so that the performance of the terminal at the cell edge can be improved. The joint transmission refers to sending data to a terminal by simultaneously using a plurality of cells, to increase a gain of a received signal of the terminal.

The uplink coordinated multipoint transmission means that a plurality of cells simultaneously receive data sent by one terminal, and then joint processing is performed on the data received by each cell, to improve demodulation quality of the terminal data. This manner is similar to that more antennas are used in a same cell to receive data sent by a terminal, and both a signal combining gain and an interference suppression gain are obtained.

In the coordinated multipoint transmission technology, a cell that jointly sends data with a cell in which the terminal is located to a terminal or that jointly receives data with a cell in which the terminal is located from a terminal is generally referred to as a coordinated cell or a collaborative cell. For ease of description, the cell is referred to as a coordinated cell below. For a terminal that accesses a network device, a coordinated cell selected by the network device is randomly selected from a neighboring cell of a cell in which the terminal is located. There are problems that the cell in which the terminal is located and the coordinated cell selected by the network device have a cell reference signal (Cell Reference Signal, CRS) collision and an inconsistent quantity of physical downlink control channel (Physical Downlink Control Channel, PDCCH) symbols, thereby causing a difficulty for the terminal to obtain a relatively high gain.

Therefore, how the network device determines a coordinated cell, so that the terminal that accesses the network device obtains a relatively high gain is an urgent problem to be resolved.

SUMMARY

Embodiments of this application aim to provide a coordinated cell determining method and a network device, so as to implement matching between a coordinated cell determined by the network device and a cell of the network device, so that when performing data transmission by using the determined coordinated cell, a terminal accessing the network device obtains a relatively high gain, thereby improving system efficiency.

An embodiment of this application further provides a coordinated cell determining method, including:

determining, by a first network device, a cell in a disabled state in a plurality of cells that are covered by a second network device; and then determining, by the first network device, the cell in the disabled state as a coordinated cell, where the first network device is adjacent to the second network device.

According to the method, the coordinated cell determined by the first network device is the cell in the disabled state. Because the cell in the disabled state does not send a broadcast message such as a reference signal or system information, the cell in the disabled state does not conflict with a cell that is of the first network device and that sends a broadcast message such as a reference signal. Therefore, when coordinated transmission is performed for a terminal in the cell of the first network device, the terminal can obtain a higher gain.

Optionally, the determining, by a first network device, a cell in a disabled state in a plurality of cells that are covered by a second network device includes:

determining, by the first network device based on a measurement report sent by a first terminal, a first cell from the plurality of cells that are covered by the second network device, where the measurement report indicates a cell in an enabled state in the plurality of cells that are covered by the second network device, and the first cell is the cell in the enabled state; and determining, by the first network device, a second cell as the cell in the disabled state if the first network device determines, based on the measurement report, that the second cell that is in the plurality of cells covered by the second network device and that is in a same frequency band as the first cell is not in the enabled state.

According to the method, the first network device can determine a status of each cell covered by the second network device by using the measurement report, so that a cell in the disabled state in the plurality of cells that are covered by the second network device can be determined in real time.

Optionally, the determining, by a first network device, a cell in a disabled state in a plurality of cells that are covered by a second network device includes:

determining, by the first network device based on a neighboring relationship table, the cell in the disabled state in the plurality of cells that are covered by the second network device, where the neighboring relationship table includes a status of each cell covered by the second network device.

According to the method, the first network device can determine the status of each cell covered by the second network device by using the neighboring relationship table, so that the cell in the disabled state in the plurality of cells that are covered by the second network device can be determined more accurately.

Optionally, after the determining, by the first network device, the cell in the disabled state as a coordinated cell, the method further includes:

determining, by the first network device, a second terminal that requires downlink collaboration and a third terminal that requires uplink collaboration, where the second terminal is a terminal whose downlink signal strength is less than a first threshold, and the third terminal is a terminal whose uplink signal strength is less than a second threshold;

jointly sending, by the first network device, a downlink signal to the second terminal by using a cell covered by the first network device and the coordinated cell; and jointly receiving, by using the cell covered by the first network device and the coordinated cell, an uplink signal sent by the third terminal.

According to the method, the first network device jointly sends, by using the coordinated cell, the downlink signal to the second terminal whose downlink signal strength is less than the first threshold, so that a gain of the downlink signal received by the second terminal increases, and network quality of the second terminal is improved. Correspondingly, the first network device jointly receives, by using the coordinated cell, the uplink signal sent by the third terminal whose uplink signal strength is less than the second threshold so that a gain of the uplink signal sent by the third terminal increases, and network quality of the third terminal is improved.

Optionally, after the determining, by the first network device, the cell in the disabled state as a coordinated cell, the method further includes:

receiving, by the first network device, N reference signal received power RSRP values sent by the second network device, where the N RSRP values are obtained after the second network device measures N terminals in the coordinated cell, and N is greater than 0; and sending, by the first network device, indication information to the second network device if the first network device determines that the N RSRP values include M RSRP values greater than an RSRP threshold, where the indication information is used to instruct the second network device to enable the coordinated cell, where M is less than or equal to N, and M is greater than 0.

According to the method, the first network device measures a terminal in the coordinated cell, so as to determine whether to instruct the second network device to enable the coordinated cell, thereby avoiding gap overheads caused by frequent inter-frequency neighbouring cell measurement performed by a terminal in the cell covered by the second network device.

Optionally, after the determining, by the first network device, the cell in the disabled state as a coordinated cell, the method further includes:

determining, by the first network device, a path loss difference of a fourth terminal, where the path loss difference is a path loss difference of the fourth terminal from a third cell to the coordinated cell, and the third cell is a cell in which the fourth terminal accesses the first network device;

determining, by the first network device based on the path loss difference, a downlink signal strength of the first cell received by the fourth terminal; and determining, by the first network device, that the fourth terminal needs to be handed over to the first cell if the first network device determines that the downlink signal strength of the first cell received by the fourth terminal is greater than a signal strength threshold.

An embodiment of this application provides a network device, where the network device may implement any one of the coordinated cell determining methods provided in the first aspect.

In a possible design, the network device includes a plurality of functional modules, for example, includes a processing unit and a transceiver unit that are configured to implement any one of the foregoing provided coordinated cell determining methods, so that a determined coordinated cell is a cell in a disabled state. Because the cell in the disabled state does not send a broadcast message such as a reference signal or system information, the cell in the disabled state does not conflict with a cell that is of the first network device and that sends a broadcast message such as a reference signal. Therefore, when coordinated transmission is performed for a terminal in the cell of the first network device, the terminal can obtain a higher gain.

An embodiment of this application provides a network device, and the network device includes:

a processor, configured to determine a cell in a disabled state in a plurality of cells that are covered by a second network device, where the network device is adjacent to the second network device; and the processor is configured to determine the cell in the disabled state as a coordinated cell.

Optionally, the processor is configured to:

determine, based on a measurement report sent by a first terminal, a first cell from the plurality of cells that are covered by the second network device, where the measurement report indicates a cell in an enabled state in the plurality of cells that are covered by the second network device, and the first cell is the cell in the enabled state; and determine a second cell as the cell in the disabled state if it is determined, based on the measurement report, that the second cell that is in the plurality of cells covered by the second network device and that is in a same frequency band as the first cell is not in the enabled state.

Optionally, the processor is configured to:

determine, based on a neighboring relationship table, the cell in the disabled state in the plurality of cells that are covered by the second network device, where the neighboring relationship table includes a status of each cell covered by the second network device.

Optionally, the network device further includes a transceiver;

the processor is further configured to determine a second terminal that requires downlink collaboration and a third terminal that requires uplink collaboration, where the second terminal is a terminal whose downlink signal strength is less than a first threshold, and the third terminal is a terminal whose uplink signal strength is less than a second threshold; and the transceiver is configured to: jointly send a downlink signal to the second terminal by using a cell covered by the network device and the coordinated cell; and jointly receive, by using the cell covered by the network device and the coordinated cell, an uplink signal sent by the third terminal.

Optionally, the network device further includes a transceiver;

the transceiver is configured to receive N reference signal received power RSRP values sent by the second network device, where the N RSRP values are obtained after the second network device measures N terminals in the coordinated cell, and N is greater than 0; and the processor is configured to: send indication information to the second network device by using the transceiver if it is determined that the N RSRP values include M RSRP values greater than an RSRP threshold, where the indication information is used to instruct the second network device to enable the coordinated cell, where M is less than or equal to N, and M is greater than 0.

Optionally, the processor is further configured to:

determine a path loss difference of a fourth terminal, where the path loss difference is a path loss difference of the fourth terminal from a third cell to the coordinated cell, and the third cell is a cell in which the fourth terminal accesses the first network device; determine, based on the path loss difference, a downlink signal strength of the first cell received by the fourth terminal; and determine that the fourth terminal needs to be handed over to the first cell if it is determined that the downlink signal strength of the first cell received by the fourth terminal is greater than a signal strength threshold.

In an embodiment of this application, a computer storage medium is further provided. The storage medium stores a software program. When being read and executed by one or more processors, the coordinated cell determining method provided in any one of the foregoing designs can be implemented.

An embodiment of this application further provides a communications system. The system includes the network device provided in any one of the foregoing designs. Optionally, the system may further include another device that interacts with the network device in the solution provided in the embodiments of this application.

An embodiment of this application further provides a computer program product including an instruction. When the computer program product runs on a computer, the computer performs the method according to the foregoing aspects.

DESCRIPTION OF EMBODIMENTS

The following further describes in detail embodiments of this application with reference to accompanying drawings.

The embodiments of this application may be applied to various mobile communications systems, such as a new radio (New Radio, NR) system, a global system for mobile communications (Global System for Mobile Communications, GSM), a code division multiple access (Code Division Multiple Access, CDMA) system, a wideband code division multiple access (Wideband Code Division Multiple Access Wireless, WCDMA) system, a general packet radio service (General Packet Radio Service, GPRS) system, a long term evolution (Long Term Evolution, LTE) system, a long term evolution-advanced (Long term evolution-advanced, LTE-A) system, a universal mobile telecommunications system (Universal Mobile Telecommunications System, UMTS), an evolved long term evolution (evolved Long Term Evolution, eLTE) system, a 5G system and other mobile communications systems.

The following describes some terms in this application, to help persons skilled in the art have a better understanding.

(1) A terminal, also referred to as user equipment (User Equipment, UE), is a device providing a user with voice and/or data connectivity, for example, a handheld device or an in-vehicle device having a wireless connection function. For example, a common terminal includes a mobile phone, a tablet computer, a notebook computer, a palmtop computer, a mobile Internet device (mobile interne device, MID), and a wearable device such as a smartwatch, a smart band, and a pedometer.

(2) A network device, may be a common base station (such as a NodeB or an eNB), may be a new radio controller (New Radio Controller, NR controller), may be a gNode B (gNB) in a 5G system, may be a centralized network element (Centralized Unit), may be a new radio base station, may be a radio remote module, may be a macro base station, may be a micro base station, may be a relay (relay) node, may be a distributed network element (Distributed Unit), may be a reception point (Transmission Reception Point, TRP) or a transmission point (Transmission Point, TP), or any other radio access device. This is not limited in the embodiments of this application.

(3) "A plurality of" means two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. In addition, it should be understood that although the terms "first", "second", "third", and the like may be used in the embodiments of this application to describe various messages, requests, and terminals, these messages, requests, and terminals are not limited to these terms, for example, a first terminal, a second terminal, and the like. These terms are only used to distinguish messages, requests, and terminals from each other, and do not mean sorting messages, requests, and terminals.

Figure 1:
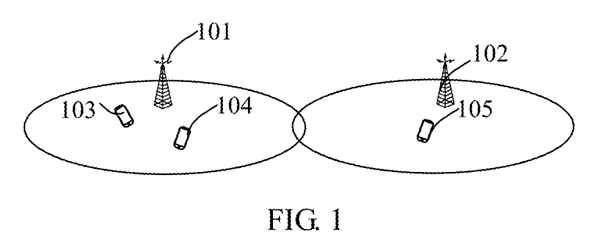
FIG. 1 is a schematic diagram of an application scenario to which an embodiment of this application is applied.
Figure 2:
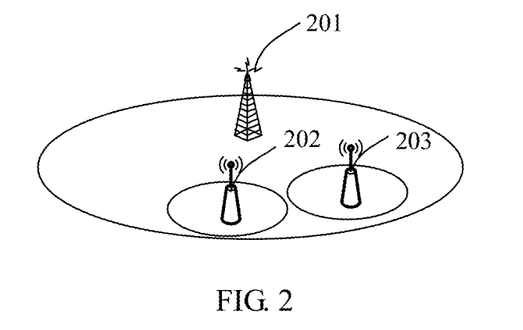
FIG. 2 is a schematic diagram of an application scenario to which an embodiment of this application is applied.

The embodiments of this application may be applied to determining a coordinated cell between macro base stations. For example, as shown in FIG. 1, in FIG. 1, a terminal 103 and a terminal 104 are located in a cell of a macro base station 101, and a terminal 105 is located in a cell of a macro base station 102. When determining a coordinated cell, the macro base station 101 may determine a cell of the macro base station 102 as the coordinated cell, and when determining a coordinated cell, the macro base station 102 may determine a cell of the macro base station 101 as the coordinated cell. The embodiments of this application may be further applied to a scenario in which a coverage area of a macro base station includes that of a micro base station. For example, as shown in FIG. 2, in FIG. 2, a signal coverage area of a macro base station 201 includes that of a micro base station 202 and a micro base station 203. When determining a coordinated cell, the micro base station 202 may determine a cell in the micro base station 203 as the coordinated cell, and when determining a coordinated cell, the micro base station 203 may determine a cell in the micro base station 202 as the coordinated cell.

Figure 3:
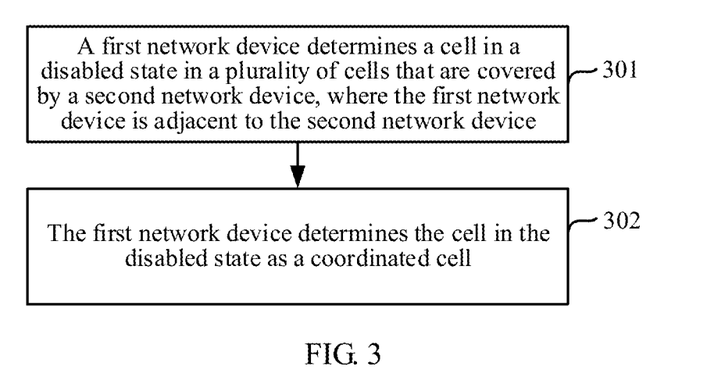
FIG. 3 is a schematic flowchart of a coordinated cell determining method according to an embodiment of this application.

With reference to the foregoing description, FIG. 3 is a schematic flowchart of a coordinated cell determining method according to an embodiment of this application.

Referring to FIG. 3, the method includes the following steps.

Step 301: A first network device determines a cell in a disabled state in a plurality of cells that are covered by a second network device, where the first network device is adjacent to the second network device.

In this embodiment of this application, a radio remote unit (Radio Remote Unit, RRU) of each network device has a capability of sending and receiving signals on a plurality of carriers in different frequency bands. Therefore, each network device may simultaneously establish a plurality of cells configured with carriers in different frequency bands. It should be noted that there are a plurality of frequency channel numbers in one frequency band. In this embodiment of this application, each network device may simultaneously establish a plurality of cells configured with carriers corresponding to different frequency channel numbers in a same frequency band.

Figure 4:
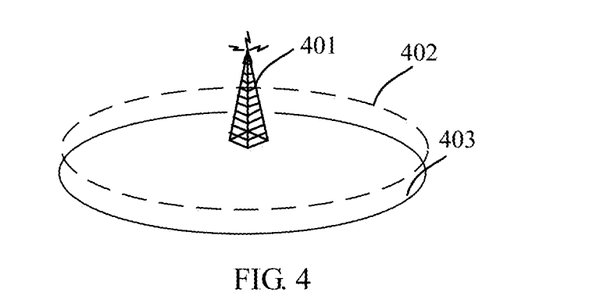
FIG. 4 is a schematic diagram of a co-coverage cell in the prior art.

If two cells in a network device are configured with carriers corresponding to different frequency channel numbers in a same frequency band, the two cells have a same signal coverage area, that is, the two cells belong to a co-coverage cell. For example, as shown in FIG. 4, in FIG. 4, a coverage area of a network device 401 includes a cell 402 and a cell 403. Carriers configured for the cell 402 and the cell 403 are carriers corresponding to different frequency channel numbers in a same frequency band, and the cell 402 and cell 403 have a same signal coverage area.

In this embodiment of this application, if a cell is in a disabled state, the network device does not establish an entity cell on a carrier configured for the cell, in other words, the network device does not send information such as a system message, a synchronization channel, and a downlink pilot signal in the cell, so that a terminal cannot detect the cell. However, the cell can use a sending and receiving capability of an RRU of the network device to assist an intra-band cell in user measurement, receiving, and sending.

In addition, it should be noted that in this embodiment of this application, that the first network device is adjacent to the second network device means that the first network device is geographically adjacent to the second network device, and a cell of the first network device and a cell of the second network device may have an overlapping coverage area. For example, with reference to FIG. 1, the network device 101 is adjacent to the network device 102.

Step 302: The first network device determines the cell in the disabled state as a coordinated cell.

In step 301, the first network device may determine, in a plurality of manners, the cell in the disabled state in the plurality of cells that are covered by the second network device.

In a first possible implementation, the first network device determines, based on a measurement report sent by a first terminal, the cell in the disabled state in the plurality of cells that are covered by the second network device.

The measurement report sent by the first terminal indicates a cell in an enabled state in the plurality of cells that are covered by the second network device, so the first network device may determine, based on the measurement report, a first cell from the plurality of cells that are covered by the second network device, where the first cell is the cell in the enabled state.

If the first network device determines, based on the measurement report, that a second cell that is in a same frequency band as the first cell and that is in the plurality of cells that are covered by the second network device is not in the enabled state, it may be determined that the second network device does not establish a second entity cell, and the first terminal cannot measure the second cell, so that the second cell can be determined as a cell in a disabled state.

Figure 5:
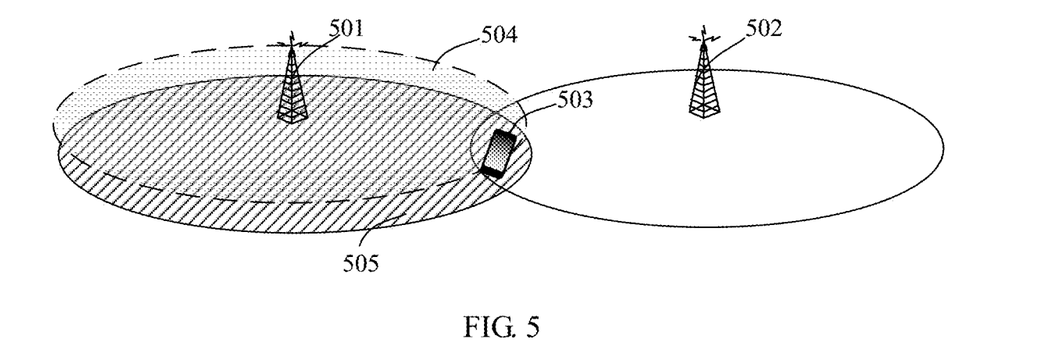
FIG. 5 is a schematic diagram of a cell according to an embodiment of this application.

For example, FIG. 5 is a schematic diagram of a cell according to an embodiment of this application. In FIG. 5, a coverage area of a network device 501 includes a cell 504 and a cell 505. A carrier configured for the cell 504 and a carrier configured for the cell 505 are carriers corresponding to different frequency channel numbers in a same frequency band, the cell 504 is in a disabled state and the cell 505 is in an enabled state, that is, the terminal can detect the cell 505 and cannot detect the cell 504. After measuring cells of the network device 501, a terminal 503 generates the measurement report, and the generated measurement report indicates that the cell 505 is in the enabled state. The terminal 503 sends the measurement report to a network device 502, and the network device 502 may determine, based on the measurement report, that the cell 505 is in the enabled state, to further determine that the cell 504 with the carrier in the same frequency band as the carrier of the cell 505 is in the disabled state, so that the cell 504 can be used as the coordinated cell.

In a second possible implementation, the first network device may determine, based on a neighboring relationship table, the cell in the disabled state in the plurality of cells that are covered by the second network device. Because the neighboring relationship table includes a status of each cell covered by the second network device, the first network device can easily determine the status of each cell covered by the second network device.

In step 302, after determining the coordinated cell, the first network device may further determine a second terminal that requires downlink collaboration and a third terminal that requires uplink collaboration.

The first network device may determine any one terminal as the second terminal that requires downlink collaboration, or the first network device may determine any one terminal as the third terminal that requires uplink collaboration.

Optionally, the first network device may also determine a terminal whose downlink signal strength is less than a first threshold as the second terminal that requires downlink collaboration, and the first network device may also determine a terminal whose uplink signal strength is less than a second threshold as the third terminal that requires uplink collaboration.

For example, if the first network device determines that a downlink reference signal received power (Reference Signal ReceivedPower, RSRP) of the terminal is less than a preset RSRP, or if the first network device determines that a channel quality indicator (Channel Quality Indicator, CQI) reported by the terminal is less than a preset CQI, it is determined that the downlink signal strength of the terminal is less than the first threshold.

For another example, if the first network device determines that an uplink RSRP of the terminal is less than a preset RSRP, or if the first network device determines that an uplink signal to interference plus noise ratio (Signal to Interference plus Noise Ratio, SINR) of the terminal is less than a preset SINR, it is determined that the uplink signal strength of the terminal is less than the second threshold.

It should be noted that a single terminal may require both downlink collaboration and uplink collaboration. The first threshold and the second threshold may be determined based on an actual situation. Details are not described herein.

Finally, the first network device may jointly send a downlink signal to the second terminal by using a cell covered by the first network device and the coordinated cell; and jointly receive, by using the cell covered by the network device and the coordinated cell, an uplink signal sent by the third terminal.

Figure 6:
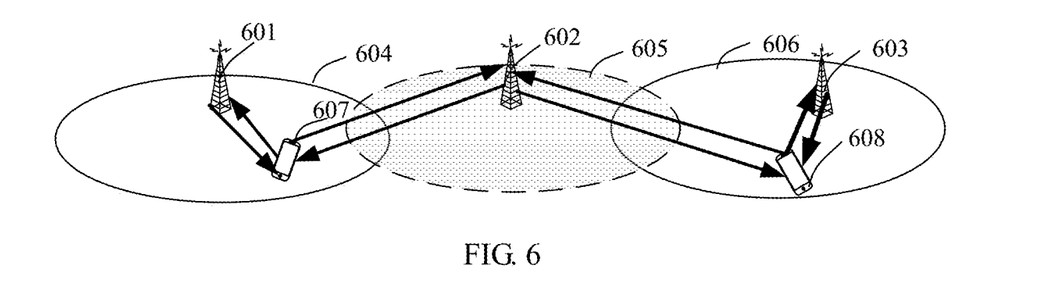
FIG. 6 is a schematic diagram of a coordinated cell according to an embodiment of this application.

For example, FIG. 6 is a schematic diagram of a coordinated cell according to an embodiment of this application. In FIG. 6, a cell 605 of a network device 602 is a coordinated cell of both a cell 604 of a network device 601 and a cell 606 of a network device 603. A terminal 607 in the cell 604 and a terminal 608 in the cell 606 simultaneously require both downlink collaboration and uplink collaboration. The cell 604 and the cell 605 may jointly receive an uplink signal of the terminal 607, and the cell 604 and the cell 605 may simultaneously transmit a same downlink signal to the terminal 607. The foregoing method may also be used by the terminal 608. This is not described herein.

After a cell of a micro base station is disabled, hotspot area identification corresponding to the cell of the micro base station requires assistance of a macro base station, and the R12 protocol defines a protocol related to small cell discovery. However, there are fewer terminals that support the R12, the R12 is still difficult to be applied in a short period of time. In this embodiment of this application, after disabling the cell, the network device may continue to measure an uplink signal strength of the terminal in the disabled cell, so as to identify a hotspot area based on the measured uplink signal strength of the terminal.

, after measuring N terminals in the coordinated cell, the second network device obtains N RSRP values, and sends the N RSRP values to the first network device, where N is greater than 0. After receiving the N RSRP values sent by the second network device, the first network device sends indication information to the second network device if the first network device determines that the N RSRP values include M RSRP values greater than an RSRP threshold, where the indication information is used to instruct the second network device to enable the coordinated cell, M is less than or equal to N, and M is greater than 0.

According to the foregoing method, after determining that the received N RSRP values include the M RSRP values greater than the RSRP threshold, the first network device may determine the coordinated cell as a hotspot area, so as to instruct the second network device to re-enable the coordinated cell, thereby implementing optimal deployment of a cell.

In this embodiment of this application, an uplink signal strength of a terminal in an intra-frequency neighboring cell may be further measured by using a coordinated cell, so as to provide measurement information for an inter-frequency cell that has a same site, a same frequency band, and same coverage as the coordinated cell, thereby avoiding gap (GAP) overheads caused when the terminal performs inter-frequency neighbouring cell measurement. The gap overheads are caused because the terminal needs to periodically stop uplink and downlink services to perform inter-frequency neighboring cell measurement, a temporary interruption of the uplink and downlink services is caused, resulting in a larger service delay.

the first network device may first determine a path loss difference of a fourth terminal, where the path loss difference is a path loss difference of the fourth terminal from a third cell to the coordinated cell, and the third cell is a cell in which the fourth terminal accesses the first network device.

Optionally, the path loss difference meets the following formula:

$$\text{DeltaPL} = (R1-G1)-(R2-G2) \tag{1}$$

Herein, DeltaPL is the path loss difference, R1 is a strength of a signal received by the third cell from the fourth terminal, that is, an uplink transmission power used when the fourth terminal sends an uplink signal in the third cell, R2 is a strength of a signal received by the coordinated cell from the fourth terminal, that is, an uplink transmission power used when the fourth terminal sends an uplink signal in the coordinated cell, G1 is an antenna gain of the third cell, and G2 is an antenna gain of the coordinated cell.

Then, the first network device determines, based on the path loss difference, a downlink signal strength of the first cell received by the fourth terminal, that is, determines a downlink signal received power of the first cell received by the fourth terminal. Optionally, the downlink signal strength of the first cell that is received by the fourth terminal and that is determined by the first network device meets the following formula:

$$\text{DLRsrp3} = (\text{DLRsrp1}-G1)-\text{DeltaPL}+G3+P3-P1 \tag{2}$$

DLRsrp3 is the downlink signal strength of the first cell received by the fourth terminal, DLRsrp1 is a downlink signal strength of the third cell, P1 is a pilot transmit power of the third cell, P3 is a pilot transmit power of the first cell, and G3 is an antenna gain of the third cell.

Cells in a same frequency band usually have a same antenna gain, that is, G3=G2, in this case, Formula (2) can be simplified as:

$$\text{DLRsrp3} = \text{DLRsrp1}+R2-R1+P3-P1 \tag{3}$$

Finally, the first network device determines that the fourth terminal needs to be handed over to the first cell if the first network device determines that the downlink signal strength of the first cell received by the fourth terminal is greater than a signal strength threshold.

After determining that the fourth terminal needs to be handed over to the first cell, the first network device may instruct the fourth terminal to be handed over to the first cell, so that the fourth terminal obtains a higher gain, thereby improving communication quality of the fourth terminal.

According to the foregoing method, the first network device measures a terminal in the coordinated cell, so as to determine whether to instruct the second network device to enable the coordinated cell, thereby avoiding gap overheads caused by frequent inter-frequency neighbouring cell measurement performed on the coordinated cell by a terminal in the cell covered by the second network device, and enhancing mobility.

Figure 7:
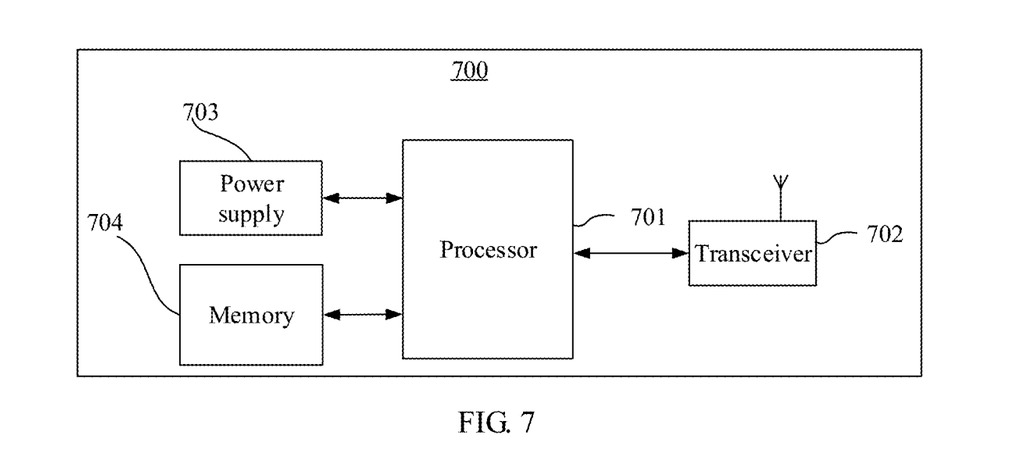
FIG. 7 is a schematic structural diagram of a network device according to an embodiment of this application.

FIG. 7 is a schematic structural diagram of a network device 700 according to an embodiment of this application. The network device may perform step 301 and step 302 in the procedure shown in FIG. 3.

Referring to FIG. 7, the network device 700 includes a processor 701, a transceiver 702, a power supply 703, and a memory 704.

The processor 701 is configured to determine a cell in a disabled state in a plurality of cells that are covered by a second network device, where the network device is adjacent to the second network device.

The processor 701 is configured to determine the cell in the disabled state as a coordinated cell.

The network device 700 may further include the power supply 703 supplying power to each component. Optionally, the power supply 703 may be logically connected to the processor 701 by using a power management system, so as to implement functions such as charge and discharge management and power consumption management by using the power management system.

The network device 700 may further include the memory 704, the memory 704 may be configured to store a software program and a module, and the processor 701 runs the software program and the module that are stored in the memory 704, to perform various functional applications of the apparatus and data processing.

Optionally, the processor 701 is configured to:

determine, based on a measurement report sent by a first terminal, a first cell from the plurality of cells that are covered by the second network device, where the measurement report indicates a cell in an enabled state in the plurality of cells that are covered by the second network device, and the first cell is the cell in the enabled state; and determine a second cell as the cell in the disabled state if it is determined, based on the measurement report, that the second cell that is in the plurality of cells covered by the second network device and that is in a same frequency band as the first cell is not in the enabled state.

Optionally, the processor 701 is configured to:

determine, based on a neighboring relationship table, the cell in the disabled state in the plurality of cells that are covered by the second network device, where the neighboring relationship table includes a status of each cell covered by the second network device.

Optionally, the network device 700 further includes the transceiver 702;

the processor 701 is further configured to determine a second terminal that requires downlink collaboration and a third terminal that requires uplink collaboration, where the second terminal is a terminal whose downlink signal strength is less than a first threshold, and the third terminal is a terminal whose uplink signal strength is less than a second threshold; and the transceiver 702 is configured to: jointly send a downlink signal to the second terminal by using a cell covered by the network device and the coordinated cell; and jointly receive, by using the cell covered by the network device and the coordinated cell, an uplink signal sent by the third terminal.

Optionally, the network device 700 further includes the transceiver 702;

the transceiver 702 is configured to receive N reference signal received power RSRP values sent by the second network device, where the N RSRP values are obtained after the second network device measures N terminals in the coordinated cell, and N is greater than 0; and the processor 701 is configured to: send indication information to the second network device by using the transceiver if it is determined that the N RSRP values include M RSRP values greater than an RSRP threshold, where the indication information is used to instruct the second network device to enable the coordinated cell, M is less than or equal to N, and M is greater than 0.

Optionally, the processor 701 is further configured to:

determine a path loss difference of a fourth terminal, where the path loss difference is a path loss difference of the fourth terminal from a third cell to the coordinated cell, and the third cell is a cell in which the fourth terminal accesses the first network device; determine, based on the path loss difference, a downlink signal strength of the first cell received by the fourth terminal; and determine that the fourth terminal needs to be handed over to the first cell if it is determined that the downlink signal strength of the first cell received by the fourth terminal is greater than a signal strength threshold.

Figure 8:
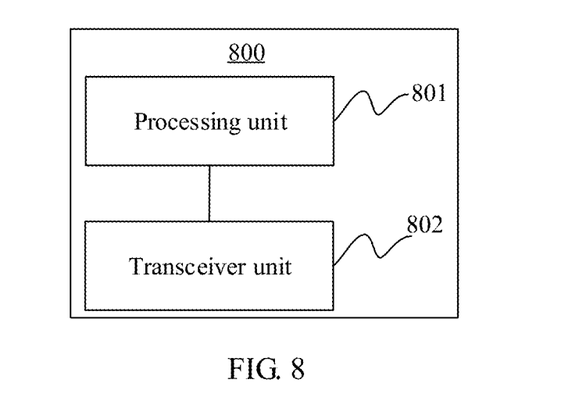
FIG. 8 is a schematic structural diagram of a network device according to an embodiment of this application.

In this embodiment of this application, the processor 701 may be implemented by a processing unit, and the transceiver 702 may be implemented by a transceiver unit. As shown in FIG. 8, a network device 800 may include: a processing unit 801 and a transceiver unit 802. The processing unit 801 may perform the procedure performed by the processor 701 in FIG. 7, and the transceiver unit 802 may perform the procedure performed by the transceiver 702 in FIG. 7. It should be understood that division of the foregoing units is merely logical function division. In actual implementation, all or some of units may be integrated into a physical entity, or may be physically separate.

Related parts of the method embodiments of this application may be mutually referenced. The apparatuses provided in the apparatus embodiments are configured to perform the methods provided in the corresponding method embodiments. Therefore, for the apparatus embodiments, refer to related parts in the related method embodiments for understanding.

Persons of ordinary skill in the art should understand that all or some of the steps of the method specified in any foregoing embodiment may be implemented by a program instructing related hardware. The program may be stored in a readable storage medium, in a device, such as a flash memory, or an EEPROM. When the program runs, the program executes all or some of the steps described above.

In the foregoing specific implementations, the objective, technical solutions, and benefits of this application are further described in detail. It should be understood that different embodiments can be combined. The foregoing descriptions are merely specific implementations of this application, but are not intended to limit the protection scope of this application. Any combination, modification, equivalent replacement, or improvement made without departing from the spirit and principle of this application should fall within the protection scope of this application.

What is claimed is:

1. A coordinated cell determining method, comprising:
   determining, by a first network device, a cell in a disabled state in a plurality of cells that are covered by a second network device, wherein the first network device is adjacent to the second network device;
   determining, by the first network device, the cell in the disabled state as a coordinated cell for coordinated multipoint transmission; and in response to determining that the cell in the disabled state as the coordinated cell for coordinated multipoint transmission,
jointly sending, by the first network device, a downlink signal by using a cell covered by the first network device and the coordinated cell; or
jointly receiving, by using the cell covered by the first network device and the coordinated cell, an uplink signal.

2. The method according to claim 1, wherein the determining, by a first network device, a cell in a disabled state in a plurality of cells that are covered by a second network device comprises:
determining, by the first network device based on a measurement report sent by a first terminal, a first cell from the plurality of cells that are covered by the second network device, wherein the measurement report indicates a cell in an enabled state in the plurality of cells that are covered by the second network device, and the first cell is the cell in the enabled state; and
determining, by the first network device, a second cell that is not in the enabled state as the cell in the disabled state if the first network device determines, based on the measurement report, that the second cell is in the plurality of cells covered by the second network device and that is in a same frequency band as the first cell.

3. The method according to claim 1, wherein the determining, by a first network device, a cell in a disabled state in a plurality of cells that are covered by a second network device comprises:
determining, by the first network device based on a neighboring relationship table, the cell in the disabled state in the plurality of cells that are covered by the second network device, wherein the neighboring relationship table comprises a status of each cell covered by the second network device.

4. The method according to claim 1, wherein after the determining, by the first network device, the cell in the disabled state as a coordinated cell, the method further comprises:
determining, by the first network device, a second terminal that requires downlink collaboration and a third terminal that requires uplink collaboration, wherein the second terminal is a terminal whose downlink signal strength is less than a first threshold, and the third terminal is a terminal whose uplink signal strength is less than a second threshold;
jointly sending, by the first network device, the downlink signal to the second terminal by using a cell covered by the first network device and the coordinated cell; and
jointly receiving, by using the cell covered by the first network device and the coordinated cell, the uplink signal sent by the third terminal.

5. The method according to claim 1, wherein after the determining, by the first network device, the cell in the disabled state as a coordinated cell, the method further comprises:
receiving, by the first network device, N reference signal received power (RSRP) values sent by the second network device, wherein the N RSRP values are obtained after the second network device measures N terminals in the coordinated cell, and N is greater than 0; and
sending, by the first network device, indication information to the second network device if the first network device determines that the N RSRP values comprise M RSRP values greater than an RSRP threshold, wherein the indication information is used to instruct the second network device to enable the coordinated cell, M is less than or equal to N, and M is greater than 0.

6. The method according to claim 1, wherein after the determining, by the first network device, the cell in the disabled state as a coordinated cell, the method further comprises:
determining, by the first network device, a path loss difference of a fourth terminal, wherein the path loss difference is a path loss difference between a path loss related to a third cell and a path loss related to the coordinated cell, and the third cell is a cell in which the fourth terminal accesses the first network device;
determining, by the first network device based on the path loss difference, a downlink signal strength of a first cell received by the fourth terminal; and
determining, by the first network device, that the fourth terminal needs to be handed over to the first cell if the first network device determines that the downlink signal strength of the first cell received by the fourth terminal is greater than a signal strength threshold.

7. An apparatus, comprising at least one processor coupled with a non-transitory storage medium storing executable instructions; wherein the executable instructions, when executed by the at least one processor, cause the apparatus to carry out the method of claim 1.

8. A network device, comprises:
at least one processor coupled to a non-transitory computer-readable storage medium storing programming instructions for execution by the at least one processor, wherein the programming instructions instruct the network device to:
determine a cell in a disabled state in a plurality of cells that are covered by a second network device, wherein the network device is adjacent to the second network device;
determine the cell in the disabled state as a coordinated cell for coordinated multipoint transmission; and
in response to determining that the cell in the disabled state as the coordinated cell for coordinated multipoint transmission,
jointly send a downlink signal by using a cell covered by the network device and the coordinated cell; or
jointly receive an uplink signal by using the cell covered by the network device and the coordinated cell.

9. The network device according to claim 8, wherein the programming instructions instruct the network device to:
determine, based on a measurement report sent by a first terminal, a first cell from the plurality of cells that are covered by the second network device, wherein the measurement report indicates a cell in an enabled state in the plurality of cells that are covered by the second network device, and the first cell is the cell in the enabled state; and
determine a second cell that is not in the enabled state as the cell in the disabled state if it is determined, based on the measurement report, that the second cell is in the plurality of cells covered by the second network device and that is in a same frequency band as the first cell.

10. The network device according to claim 8, wherein the programming instructions instruct the network device to:
determine, based on a neighboring relationship table, the cell in the disabled state in the plurality of cells that are covered by the second network device, wherein the neighboring relationship table comprises a status of each cell covered by the second network device.

11. The network device according to claim 8,
wherein the programming instructions instruct the network device to:
   determine a second terminal that requires downlink collaboration and a third terminal that requires uplink collaboration, wherein the second terminal is a terminal whose downlink signal strength is less than a first threshold, and the third terminal is a terminal whose uplink signal strength is less than a second threshold;
   jointly send the downlink signal to the second terminal by using a cell covered by the network device and the coordinated cell; and
   jointly receive, by using the cell covered by the network device and the coordinated cell, the uplink signal sent by the third terminal.

12. The network device according to claim 8,
wherein the programming instructions instruct the network device to:
   receive N reference signal received power (RSRP) values sent by the second network device, wherein the N RSRP values are obtained after the second network device measures N terminals in the coordinated cell, and N is greater than 0; and
   send indication information to the second network device if it is determined that the N RSRP values comprise M RSRP values greater than an RSRP threshold, wherein the indication information is used to instruct the second network device to enable the coordinated cell, M is less than or equal to N, and M is greater than 0.

13. The network device according to claim 8, wherein the programming instructions instruct the network device to:
   determine a path loss difference of a fourth terminal, wherein the path loss difference is a path loss difference between a path loss related to a third cell and a path loss related to the coordinated cell, and the third cell is a cell in which the fourth terminal accesses the first network device;
   determine, based on the path loss difference, a downlink signal strength of a first cell received by the fourth terminal; and
   determine that the fourth terminal needs to be handed over to the first cell if it is determined that the downlink signal strength of the first cell received by the fourth terminal is greater than a signal strength threshold.

* * * * *